United States Patent Office 3,019,218
Patented Jan. 30, 1962

3,019,218
PROCESS FOR AMINATION OF ALPHA-HALO-EPSILON-CAPROLACTAMS
William C. Francis, Overland Park, Kans., assignor to Spencer Chemical Company, Kansas City, Mo., a corporation of Missouri
No Drawing. Filed Nov. 24, 1959, Ser. No. 855,028
11 Claims. (Cl. 260—239.3)

This invention relates to a process for the production af alpha-amino-epsilon-caprolactam, a precursor of the essential amino acid lysine. More specifically, this invention relates to an improved process for producing alpha-amino-epsilon-caprolactam by the amination of alpha-halo-epsilon-caprolactams.

W. C. Francis and T. R. Hopkins, U. S. Patent No. 2,876,218, issued March 3, 1959, describe a new process for the preparation of alpha-amino-epsilon-caprolactam through the reaction of alpha-halo-epsilon-caprolactams with liquid ammonia. It is the object of this invention to provide an improvement in the aforementioned process.

As will be noted in the above patent, the amination of alpha-halo-epsilon-caprolactams is accompanied by varying amounts of piperidine-2-carboxamide by-product. It is indicated, however, that the amount of piperidine-2-carboxamide can be controlled according to the reaction conditions employed, and can be reduced, thereby increasing the conversion of alpha-halo-epsilon-caprolactam to the desired alpha-amino-epsilon-caprolactam, by the judicious use of a high molar ratio of ammonia to halo lactam.

Obviously, the formation of piperidine-2-carboxamide in this process is highly disadvantageous; since it is an isomer of the desired alpha-amino-epsilon-caprolactam, the similarity of structure and functionality hinders the efficient separation of the two products. Only a partial separation can be effected by fractional recrystallization from ethanol or methanol and this operation requires a large amount of solvent accompanied by high material losses. Further, in order to suppress the formation of piperidine-2-carboxamide to any appreciable extent, according to the process disclosed above, it is necessary to provide for a large excess of liquid ammonia. This in turn imposes limitations upon the unit of product produced per reactor volume, and introduces other economic considerations as well.

The competing reactions may be represented by the following equations:

(a)
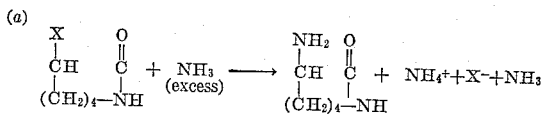

(b)
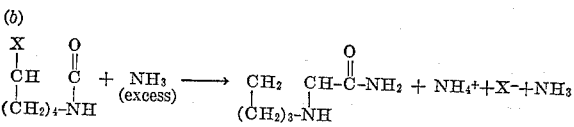

wherein X is a halogen, particularly chlorine, bromine or iodine.

One of the products which is formed during the amination is ammonium halide. Owing to its high solubility in liquid ammonia, the concentration of ammonium halide tends to increase in the system as the amination reaction proceeds. Moreover, experiments have shown that the yield of alpha-amino-epsilon-caprolactam (reaction a) is decreased and yield of piperidine-2-carboxamide (reaction b) is increased if ammonium halide is charged to the initial reaction mixture along with the alpha-halo-epsilon-caprolactam and anhydrous ammonia. Further, it has been shown that when decreasing amounts of liquid ammonia are used, resulting in reaction mixtures with correspondingly increased concentrations of ammonium halide, the yield of piperidine-2-carboxamide is likewise increased. Also, conducting the amination at higher temperatures and/or longer reaction times in order to effect more complete conversion of the alpha-halo-epsilon-caprolactam results in increased ammonium halide, accompanied by increased carboxamide. These various experimental results indicate that ammonium halide is a controlling factor in the formation of the undesired piperidine-2-carboxamide. Therefore, if the ammonium halide can be removed immediately from the reaction medium as it is formed, or if its concentration can be held to a minimum, the by-product piperidine-2-carboxamide might then be eliminated, or reduced to significantly lower levels. It appears that the ammonuim halide acts as a catalyst for the formation of piperidine-2-carboxamide, which formation proceeds by nucleophilic attack of the ammonia molecule at the carbonyl group, followed by cleavage of the amide bond and rearrangement to the alpha carbon atom with loss of hydrogen chloride.

Thus it has been found that to increase the conversion of alpha-halo-epsilon-caprolactam to alpha-amino-epsilon-caprolactam and correspondingly decrease the yield of piperidine-2-carboxamide, certain additives can be used which exert the effect of removing the ammonium ions, or minimizing the accumulation of such ammonium ions in the reaction system. Accordingly, there is provided by this invention an improved process for producing alpha-amino-epsilon-caprolactam by reacting an alpha-halo-epsilon-caprolactam with ammonia under liquid reaction conditions in the presence of an ammonium ion scavenger. The ammonium ion scavenger removes the ammonium ions as they are formed as a by-product of the amination reaction thereby reducing the formation of the undesirable piperidine-2-carboxamide to very low levels and in many cases completely eliminating the formation of the piperidine-2-carboxamide. The ammonium ion scavenger, which must be substantially inert to the halo lactam, effectively removes the ammonium ions by forming a new ammonia-insoluble salt or complex which is kinetically inactive with regard to competition in the amination reaction.

Ammonium ion scavengers which are especially effective for use in this invention include the alkali metal and alkaline earth metal carbonates, bicarbonates, oxides, arsenites, and salts of carboxylic acid-type and sulfonic acid-type cation exchange resins as well as the alkali metal and alkaline earth metal salts of dibasic organic acids such as oxalic acid, succinic caid and malonic acid. Especially useful are the potassium salts such as potassium carbonate, potassium bicarbonate, potassium arsenite, potassium oxalate, potassium succinate and the potassium salt of IRC–50 (a product of Rohm & Haas Co. described as a weakly acidic, carboxylic acid-type cation exchange resin). Other alkali metal and alkaline earth metal salts such as the calcium, barium and sodium salts are effective also in removing ammonium ions from solution in liquid ammonia.

The amount of ammonium ion scavenger used is dependent upon the amount of alpha-halo-epsilon-caprolactam charged to the reaction mixture. For best results at least an equivalent amount of scavenger should be used for each equivalent of halo lactam. Preferably about 1–2 equivalents of scavenger is used for each equivalent of halo lactam.

As hereinbefore stated, by using the ammonium ion scavenger as an additive for the amination reaction, substantially lesser amounts of ammonia can be used to obtain yields of amonio lactam comparable to and of significantly higher purity than those obtained when using large excesses of ammonia without the scavenger. Generally, a molar excess of ammonia is used and preferably a molar equivalent ratio of ammonia:halo lactam of about 20:1 to about 80:1 is used to obtain superior yields of the desired product with substantially no formation of piperidine-2-carboxamide. Of course, larger excesses of ammonia may be employed but such would be unnecessary and impractical.

The reaction proceeds most effectively at elevated temperatures such as from 50–100° C. at autogenous pressures. Optimum temperatures as well as pressures will vary with the particular alpha-halo-epsilon-caprolactam employed but will be easily determined for each by those skilled in the art. Reaction times will also vary; however, 6–24 hours is often adequate although reaction times of 2–3 days may also be employed without deleterious effect.

The alpha-amino-epsilon-caprolactam prepared as above may be isolated from the reaction mixture by conventional means after the amination reaction is terminated. Generally, the reaction mixture is cooled to low temperature, preferably below the liquification temperature of ammonia, and filtered to remove the insoluble ammonium salt or complex. The liquid ammonia filtrate is evaporated to remove the ammonia and leave a residue of alpha-amino-epsilon-caprolactam and alpha-halo-epsilon-caprolactam. The amino lactam can be converted to its hydrochloride from which the halo lactam can be readily separated by appropriate solvent extraction such as with acetone.

While it is not necessary in all instances that the metal halide salt which is formed from the scavenger be insoluble in ammonia, the treatment of the reaction mixture subsequent to the amination is simplified if the halide can be removed in an insoluble form. Otherwise, the soluble halides can be separated from the amination product by other suitable separation procedures, for example, solvent extraction.

The following examples are intended for purposes of illustration and are not meant to limit the scope of this invention as modifications will be obvious to those skilled in the art.

EXAMPLE 1

A series of aminations of alpha-chloro-epsilon-caprolactam was carried out in the presence of various salts as ammonium ion scavengers.

In a typical example, a 750 ml. stainless-steel reactor was charged with 44 grams (0.3 mole) of alpha-chloro-epsilon-caprolactam, 25 g. (0.18 mole) of potassium carbonate, and 350 ml. (14.8 moles) of liquid ammonia. The mixture was heated with agitation at 85° C. for 24 hours. The reactor was cooled in a Dry Ice-methanol bath, and the liquid ammonia was drawn off under suction through a sintered glass filter stick into a cooled trap. The insoluble residue was washed with two 50-ml. portions of liquid ammonia. The combined filtrates were evaporated, and the dried residue was dissolved in 65 ml. of absolute ethanol and filtered. The ethanol solution was diluted with additional solvent, concentrated under reduced pressure, and rediluted to a volume of 140 ml. Acidification by addition of ethanol saturated with hydrogen chloride resulted in precipitation of crystalline product which was collected and washed with acetone. The ethanol filtrate was evaporated by distillation under reduced pressure, and the residue extracted with acetone. The combined acetone-insoluble materials were dried to yield 21.8 g. (67.4% yield) of alpha-amino-epsilon-caprolactam hydrochloride, M.P. 289–293° C. The infrared spectrum corresponded to that of an authentic sample and showed no piperidine-2-carboxamide or other impurity to be present. This material burned to leave no ash, and analyzed correctly for the calculated chloride ion content of 21.5%.

The combined acetone extracts were evaporated under reduced pressure, and the dried residue was recrystallized from ligroin to yield 15 g. (34% recovery) of alpha-chloro-epsilon-caprolactam, M.P. 89–91° C. Evaporation of the ligroin filtrate yielded 5.1 g. of sirupy residue. The infrared spectrum of this material indicated it to contain more than 50% unreacted alpha-chloro-epsilon-caprolactam.

Other aminations carried out in the presence of potassium carbonate, potassium bicarbonate, calcium oxide and potassium arsenite as ammonium ion scavengers as well as a control run using no scavenger were worked up and analyzed in the above-described manner. The results are recorded in Table I.

Table I

AMINATION OF ALPHA-CHLORO-EPSILON-CAPROLACTAM IN THE PRESENCE OF AMMONIUM ION SCAVENGERS

[Conditions: Reactant ratios—scavenger:halo lactam:$NH_3$+1.2:1:50]

Temperature—85° C.

Time—24 hrs.

| Run No. | Ammonium Ion Scavenger | Recovered α-Chloro-ε-caprolactam (percent) a | Net Yield (Percent) b | |
|---|---|---|---|---|
| | | | α-Amino-ε-caprolactam·HCl | Piperidine-2-carboxamide·HCl |
| 1 | None | 0 | 43.0 | 47.9 |
| 2 | $KHCO_3$ | 0 | 43.8 | 24.7 |
| 3 | CaO | 65.5 | 60.5 | trace |
| 4 | $KAsO_2$ | 25.0 | 65.9 | 3.9 |
| 5 | $K_2CO_3$ | 34.4 | 68.4 | 0 | a Based on product obtained from recrystallization of the crude, recovered chloro lactam.
b Based on infrared analysis of the mixture of amination products.

EXAMPLE 2

A series of aminations was carried out in the presence of the potassium and sodium salts of Amberlite IRC–50 (a product of Rohm & Haas Co. described as a weakly acidic, carboxylic acid-type cation exchange resin). The procedure used was the same as described in Example 1 above. The results are recorded in Table II.

Table II

AMINATION OF ALPHA-CHLORO-EPSILON-CAPROLACTAM IN THE PRESENCE OF ION EXCHANGE RESIN SALTS AS AMMONIUM ION SCAVENGERS

| Run No. | Salt Form of Resin (IRC-50) | Equivalent Ratio, Resin·Lactam:Ammonia | Reaction Conditions | | Recovered Chloro lactam (percent) a | Net Yield (Percent) b | |
|---|---|---|---|---|---|---|---|
| | | | Temp. (°C.) | Time (hrs.) | | Amino lactam·HCl | Piperidine-2-carboxamide·HCl |
| 1 | None | 0:1:95 | 80 | 26.5 | 0 | 51.5 | 49.5 |
| 2 | Potassium | 1:1:83 | 70 | 26.5 | 58.8 | 56.0 | 0.2 |
| 3 | do | 1:1:83 | 80 | 26.5 | 35.1 | 73.0 | 0.9 |
| 4 | do | 1:1:83 | 90 | 26.5 | 23.0 | 78.5 | 5.4 |
| 5 | do | 1:1:83 | 100 | 26.5 | 7.1 | 62.3 | 0 |
| 6 | do | 1:1:40 | 70 | 66.5 | 6.4 | 52.2 | 1.3 |
| 7 | do | 1:1:20 | 70 | 66.5 | 17.6 | 60.2 | trace |
| 8 | Sodium | 1:1:83 | 70 | 68 | 4.4 | 65.7 | 18.8 | a Based on product obtained from recrystallization of the crude recovered chloro lactam.
b Based on infrared analysis of the mixture of amination products.

EXAMPLE 3

A series of reactions was carried out in the presence of potassium carbonate under varying reaction conditions, according to the procedure of Example 1. The results are recorded in Table III.

*Table III*

AMINATION OF ALPHA-CHLORO-EPSILON-CAPROLACTAM IN THE PRESENCE OF POTASSIUM CARBONATE

| Run No. | Equivalent Ratio $K_2CO_3$: Lactam:$NH_3$ | Reaction Conditions | | Recovered chloro lactam (percent)[a] | Net Yield (Percent)[b] | |
|---|---|---|---|---|---|---|
| | | Temp. (°C.) | Time (hrs.) | | Amino lactam·HCl | Piperidine-2-carboxamide·HCl |
| 1 | 1.2:1:50 | 85 | 60 | 0 | 72.5 | 11.8 |
| 2 | 1.2:1:50 | 85 | 24 | 34.4 | 68.4 | 0 |
| 3 | 2.0:1:50 | 80 | 48 | 37.7 | 76.5 | 0 |
| 4 | 1.7:1:50 | 80 | 54 | 19.0 | 69.9 | 0.3 |
| 5 | 1.4:1:50 | 75 | 24 | 48.1 | 67.2 | 0 |

[a] Based on product obtained from recrystallization of the crude recovered chloro lactam.
[b] Based on infrared analysis of the mixture of amination products.

EXAMPLE 4

In the amination of alpha-bromo-epsilon-caprolactam there appears to be very little formation of the by-product piperidine-2-carboxamide. For example, with 50 moles of liquid ammonia, a 61% net yield of amino lactam was realized, accompanied by about 1% of piperidine-2-carboxamide when no ammonium ion scavenger was used.

When alpha-bromo-epsilon-caprolactam was reacted with liquid ammonia at 50° C. for 24 hours in the presence of calcium oxide as an ammonium ion scavenger (CaO:lactam:$NH_3$ ratio=1.4:1:50) a 61% net yield of alpha-amino-epsilon-caprolactam hydrochloride was obtained with no detectable piperidine-2-carboxamide hydrochloride.

Other salts found to be effective ammonium ion scavengers for removing ammonium chloride from solution in liquid ammonia include potassium succinate, potassium oxalate, barium carbonate, calcium carbonate, and the calcium and barium salts of IRC-50 as well as the sodium salt of Amberlite IR-120 (a product of Rohm and Haas Co. described as a strongly acidic, sulfonic acid-type cation exchange resin).

Various changes and modifications of the invention can be made and, to the extent that such variations incorporate the spirit of this invention, they are intended to be included within the scope of the appended claims.

What is claimed is:

1. In the method for the preparation of alpha-amino-epsilon-caprolactam wherein an alpha-halo-epsilon-caprolactam is reacted with ammonia under liquid reaction conditions, the improvement which comprises conducting said reaction in the presence of an ammonium ion scavenger which reacts with ammonium ions to form an ammonia-insoluble ammonium compound, so that the ammonium ions are removed from said liquid reaction solution as they are formed thereby minimizing piperidine-2-carboxamide formation.

2. The method of claim 1 in which at least one equivalent of ammonium ion scavenger is present for each mole of alpha-halo-epsilon-caprolactam.

3. The method of claim 1 wherein said alpha-halo-epsilon-caprolactam is alpha-chloro-epsilon-caprolactam.

4. In the method for the preparation of alpha-amino-epsilon-caprolactam wherein alpha-chloro-epsilon-caprolactam is reacted with excess liquid ammonia at a temperature in the range of about 50° to about 100° C., the improvement which comprises conducting said reaction in the presence of an ammonium ion scavenger which reacts with ammonium ions to form an ammonia-insoluble ammonium compound, so that the ammonium ions are removed from said liquid ammonia solution as they are formed thereby minimizing piperidine-2-carboxamide formation.

5. The process of claim 1 in which said ammonium ion scavenger is potassium carbonate.

6. The process of claim 1 in which said ammonium ion scavenger is calcium oxide.

7. The process of claim 1 in which said ammonium ion scavenger is the potassium salt of a weakly acidic, carboxylic acid-type cation exchange resin.

8. The process of claim 1 in which said ammonium ion scavenger is a potassium salt which reacts with ammonium ions to form an ammonia-insoluble ammonium compound.

9. The process of claim 1 in which the reaction is run at an elevated temperature up to about 100° C. and at essentially autogenous pressure.

10. The process of claim 4 in which said ammonium ion scavenger is potassium carbonate.

11. In the method for the preparation of alpha-amino-epsilon-caprolactam wherein an alpha-halo-epsilon-caprolactam is reacted with at least 20 mole-equivalents of liquid ammonia, the improvement which comprises conducting said reaction in the presence of an ammonium ion scavenger which reacts with ammonium ions to form an ammonia-insoluble ammonium compound, so that the ammonium ions are removed from said liquid ammonia solution as they are formed thereby minimizing piperidine-2-carboxamide formation.

References Cited in the file of this patent

UNITED STATES PATENTS 2,876,218    Francis et al. _____ Mar. 3, 1959

UNITED STATES PATENT OFFICE
CERTIFICATION OF CORRECTION

Patent No. 3,019,218            January 30, 1962

William C. Francis

It is hereby certified that error appears in the above numbered patent requiring correction and that the said Letters Patent should read as corrected below.

Column 1, lines 49 to 58, the equations should appear as shown below instead of as in the patent:

(a) 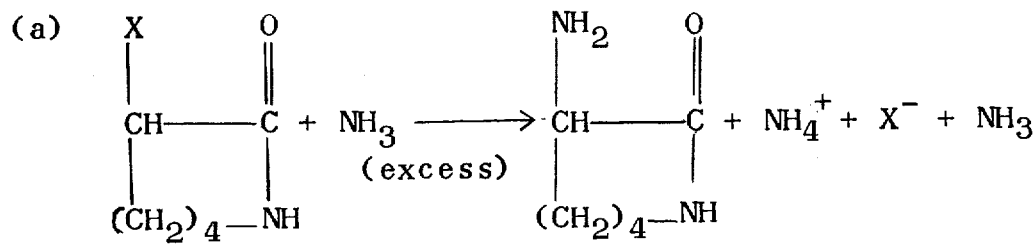

(b) 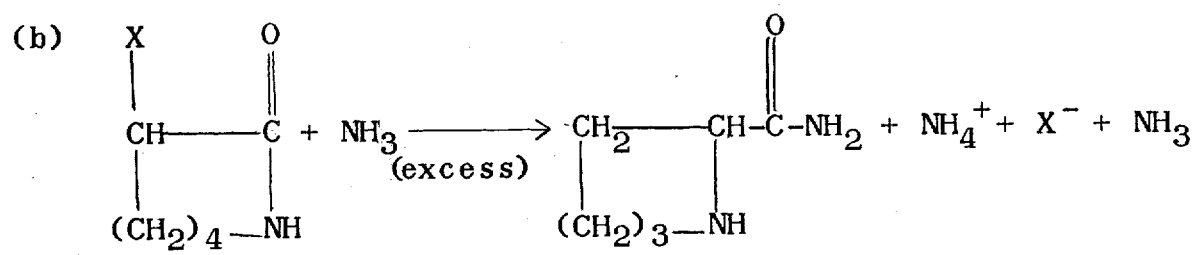

column 2, line 49, for "caid" read -- acid --.

Signed and sealed this 26th day of June 1962.

SEAL)
Attest:

ERNEST W. SWIDER
Attesting Officer

DAVID L. LADD
Commissioner of Patents